United States Patent [19]

Bennett, Jr.

[11] 4,353,422
[45] Oct. 12, 1982

[54] HAND HELD POWER MACHINE WITH OSCILLATING TOOL

[76] Inventor: James H. Bennett, Jr., 1013 Cowpens Rd., Towson, Md. 21204

[21] Appl. No.: 134,076

[22] Filed: Mar. 26, 1980

[51] Int. Cl.³ ............................................. A01B 1/22
[52] U.S. Cl. ..................................... 172/41; 56/16.4; 56/400.17; 74/25; 15/22 A; 172/84
[58] Field of Search ...................... 172/41, 42, 43, 84, 172/101; 74/25, 101; 56/16.4, 16.7, 400.02, 400.14, 400.15, 400.17; 15/22 A, 79 R, 79 A

[56] References Cited

U.S. PATENT DOCUMENTS

| 893,068 | 7/1908 | Gay | 74/110 |
| 1,827,074 | 10/1931 | Ditlevsen | 172/41 |
| 2,792,769 | 5/1957 | Harshberger | 172/42 X |
| 3,057,412 | 10/1962 | Hovis, Jr. | 172/42 |
| 3,204,704 | 9/1965 | Goette | 172/42 X |
| 3,406,761 | 10/1968 | Ryan | 172/42 |
| 3,824,773 | 7/1974 | Brubaker | 56/16.7 X |
| 4,122,902 | 10/1978 | Alexander | 172/41 |

FOREIGN PATENT DOCUMENTS

| 2422939 | 12/1974 | Fed. Rep. of Germany | 74/25 |
| 842871 | 7/1960 | United Kingdom | 172/41 |

Primary Examiner—Richard T. Stouffer

[57] ABSTRACT

A light weight hand-held power actuated tool for aiding an operator do work such as raking, thatching, cultivating, hoeing and sweeping.

A main member with handles for operator support has a motor attached. The motor activates a mechanism which holds a working tool such as a rake, thatching tool, cultivator, hoe or broom. The mechanism is such that the working tool is driven in a continuous oscillating motion similar to conventional hand raking, thatching, cultivating, hoeing or sweeping.

9 Claims, 5 Drawing Figures

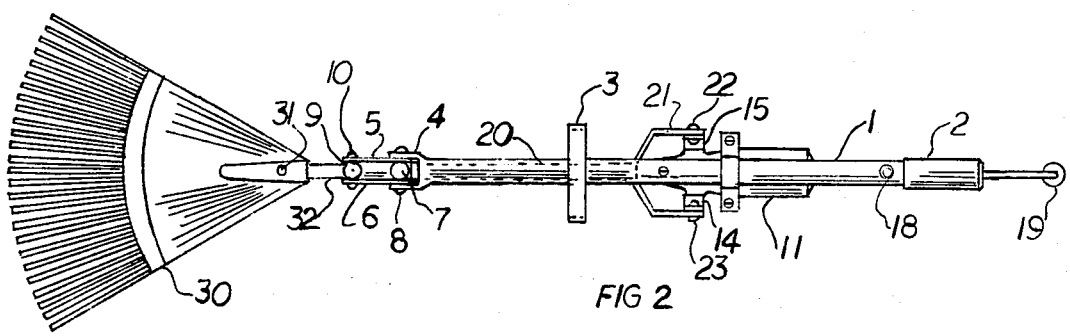
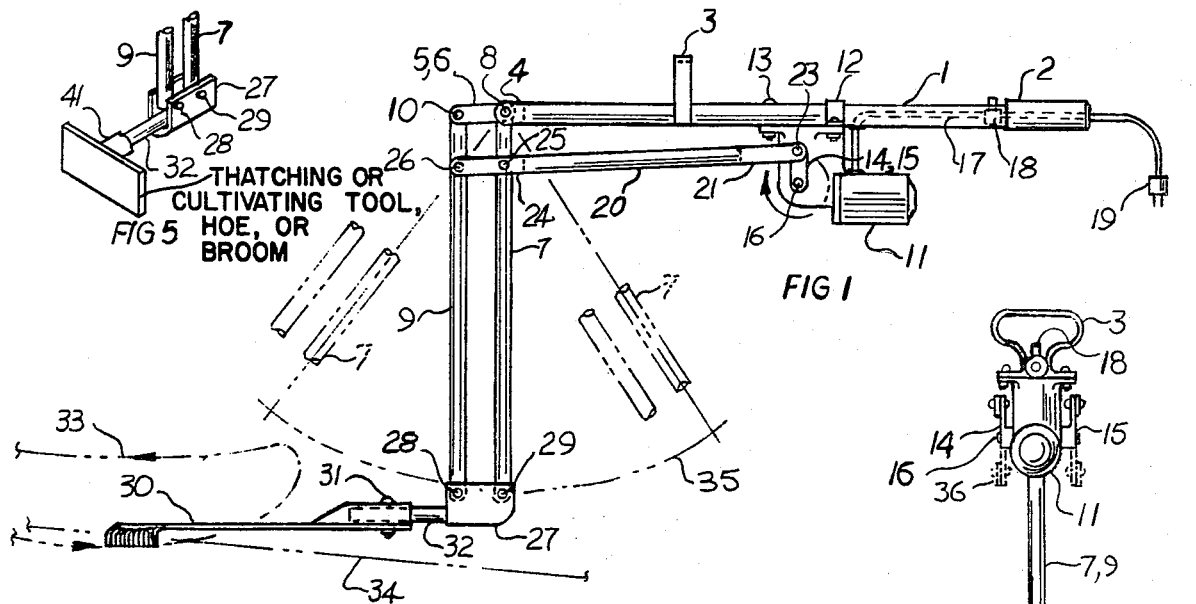
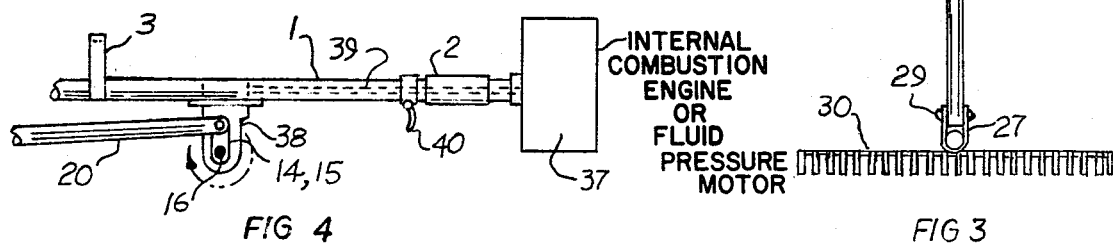

HAND HELD POWER MACHINE WITH OSCILLATING TOOL

RELATED PATENT

U.S. Pat. No. 3,406,761 describes a type of power rake having several points of advantage for using power for raking, however, this machine is relatively heavy and mounted on wheels resting on the ground. The machine is not as flexible and useful as a light weight hand-held unit which can accommodate all types of terrain and can be used in any angle or position such as the subject invention.

BACKGROUND OF THE INVENTION

The work of raking lawns and gardens by hand to remove leaves, grass, thatch and other debris is a fatiguing and time consuming job. This invention of a light weight hand-held mechanism using an electric motor or other power source to actuate a rake or other similar hand tool, was invented to make the job of raking, thatching, cultivating and hoeing much easier. The operator can work faster and for longer periods of time with relative ease. Although developed primarily for work on lawns, this hand-held power tool is applicable for garden and farm work, use by contractors to rake material, and for any other operation where hand raking is desirable. Simple tool changes may be made so that the machine can be used as a rake, thatcher, cultivator, hoe or broom sweeper.

BRIEF SUMMARY OF INVENTION

The object of the present invention is to provide a means of applying power to operate a conventional hand-held rake or other cultivating or working tool, in an oscillatory motion to perform work on the ground or surface, thereby reducing operator fatigue and enabling work to be accomplished faster.

A conventional rake head or tool is attached to a light-weight mechanism which is driven by a power means mounted on a hand-held main member. The power driven mechanism causes a tool to oscillate forward and rearward in a continuous cycle. The motion is such that the tool is on the ground or surface during its rearward or power stroke; as the rearward stroke ends and reverses, the tool raises over worked material, makes a forward return stroke and dips again to the surface to repeat its rearward power stroke. The operators hands remain in a relatively fixed position or the operator may move his hands to amplify and assist the working motion.

BRIEF DESCRIPTION OF DRAWINGS

FIG. 1 is a view in side elevation showing the unit in a mid-position with an outline of travel position.

FIG. 2 is a plan view of the unit in same position as FIG. 1.

FIG. 3 is a rear view of the unit looking forward.

FIG. 4 is a partial view of the side elevation as shown in FIG. 1, except that a small internal combustion engine or fluid pressure motion is shown in lieu of an electric motor to provide power.

FIG. 5 is a view of the lower tool holder linkage illustrating how a thatching, cultivating, hoeing or sweeping tool may be attached in lieu of a rake.

PREFERRED EMBODIMENT OF THE INVENTION

A main member support tube 1 has a grip type handle 2 which covers its butt end. At about ⅓ the length of the tube from the opposite end, a loop type handle 3 is attached. This loop handle is near the center of gravity of the assembled unit so that the unit is balanced during use and while carrying when not operating.

The unit is normally supported with these handles by the operator using two hands. The front end of support tube 1 is equipped with a clevis fitting 4 which serves as the support for the primary linkage pivot point. It accepts links 5 and 6 and tube link 7. A hinge pin 8 passes through links 5, 6 and 7 to pivotally fasten these links to the clevis 4. A tube link 9 is mounted parallel to tube link 7 and is pivotally connected to links 5 and 6 by hinge pin 10. A gear motor 11 is attached to the support tube 1 between the forward and rear handles by bracket 12 and bolt 13.

Two cranks 14 and 15 having a radius suitable to provide proper travel to the said four-bar linkage are attached to drive shaft 16 of the gearmotor 11. The drive shaft extends beyond the gearmotor case on each side to enable attachment of the cranks and rotates so that the cranks move in a clockwise direction as indicated by the arrow.

The ratio of the gearmotor 11 is such that the drive shaft 16 makes approximately one revolution per second under no load condition and may reduce in speed as the load increases. A power of about 1/12 horsepower is adequate to drive a conventional lawn rake and other tools. The speed and power of operation may be adjusted to suit the operator and working conditions. Electrical power is supplied by connecting wires 17 which are connected through switch 18 to the pigtail external connector 19. Switch 18 is normally open. An electrical circuit is made when switch button is pressed and breaks when released, thus starting and stopping the motor.

For single insulated motors, a three wire system is used for grounding the unit against possible electrical shock. An external electrical extension line (not shown) is connected to plug 19 to provide electrical energy.

Attached to the cranks 14 and 15 is a push-pull rod 20 have a wide clevis 21 for pivotal mounting to the cranks by means of hinge pins 22 and 23. The other end of the rod 20 is provided with a narrow clevis 24, which is adapted to accept tube links 7 and 9 and which is attached thereto by hinge pins 25 and 26. A tool holding link 27 is pivotally attached to tube links 7 and 9 by hinge pins 28 and 29. This link 27 completes a fourbar linkage. A rake head 30 which may be a commercially available bamboo, plastic or metal rake, attaches by a bolt 31 to a short rake shaft 32 which is rigidly fastened to the tool holding link 27 by bolts or rivets (not shown).

All hinge points are equipped with bushings or bearings to reduce wear and friction. Tubes and linkages may be made of aluminum or other light-weight material to keep the total unit weight low. On FIG. 1, phantom line 33 indicates travel and direction of the rake leading edge during the back portion of its cycle. Phantom line 34, FIG. 1., indicates the approximate surface or ground line. Phantom lnes 35 indicate limits of linkage 7 and 9 travel. Phantom lines 36 on FIG. 3, indicate the lower position of cranks 14 and 15 travel.

FIG. 4 shows a configuration using a small internal combustion engine or fluid pressure motor 37 to provide power where electricity is not available or where freedom from electrical cord is desired. A detached gear box 38 is driven by a shaft 39 from said engine. A finger throttle 40 engages the engine and controls speed.

FIG. 5 shows how various other tools 41 such as a thatcher, cultivator, hoe, or broom may be attached to the tool holding linkage for applications other than raking.

Although the above description is the preferred embodiment, it is possible to adapt other linkages or mechanical configurations to transfer power to a tool head to cause it to move in a similar raking motion.

This invention envisions this possibility.

I claim:

1. A hand-held power machine for aiding an operator in performing work, said machine comprising a main support member, said main support member being provided with handle means to facilitate the holding of said machine by the operator thereof, power means attached to said main support member, a connecting means connected to said power means, said connecting means comprising crank means operated by said power means, a push-pull rod attached to said crank means, said rod extending generally parallel to said main support means and being moved back and forth relative to said main support means by said crank means as said crank means is operated by said power means, a first link pivotally mounted on one end thereof to one end of said main support member, a second link pivotally mounted on one end thereof to said one end of said first link and said one end of said main support member, a third link pivotally mounted on one end thereof to the opposite end of said first link, said second link and said third link being pivotally connected to said push-pull rod at longitudinally spaced locations along said rod, said locations being spaced sufficiently such that along with the spacing of said second link and said third link by said first link, said second link and said third link are maintained generally parallel to each other, the other end of said second link and the other end of said third link being pivotally connected to a tool holding link at spaced locations on said tool holding link, a tool attached to said tool holding link, whereby as said push-pull bar is moved back and forth by said power means, said tool is caused to move in a cyclical oscillatory motion.

2. The hand-held power actuated machine of claim 1 wherein the power means is an electric motor.

3. The hand-held power actuated machine of claim 1 wherein the power means is an internal combustion engine.

4. The hand-held power actuated machine of claim 1 wherein the power means is supplied by fluid pressure.

5. The hand-held power actuated machine of claim 1 wherein the attached tool is a rake.

6. The hand-held power actuated machine of claim 1 wherein the attached tool is a thatching tool.

7. The hand-held power actuated machine of claim 1 wherein the attached tool is a cultivating tool.

8. The hand-held power actuator machine of claim 1 wherein the attached tool is a hoe.

9. The hand-held power actuated machine of claim 1 wherein the attached tool is a broom.

* * * * *